D. C. ROBERTS.
TIRE MOLD.
APPLICATION FILED JUNE 19, 1916.
1,233,810.
Patented July 17, 1917.
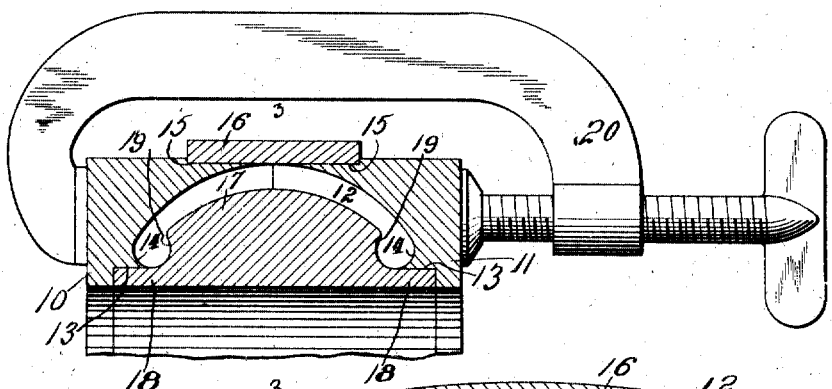
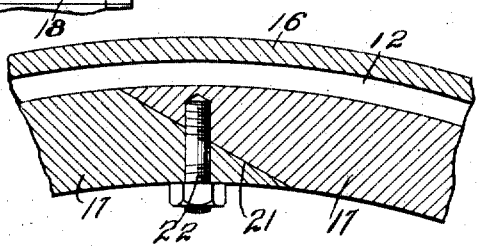
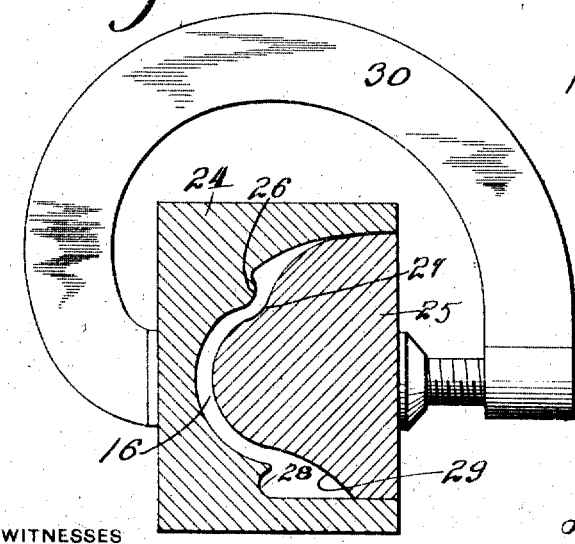
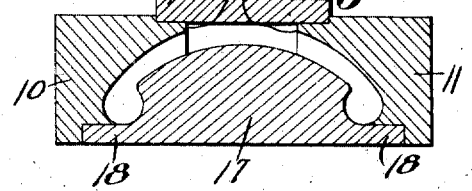
WITNESSES
INVENTOR
Daniel C. Roberts
BY
ATTORNEY

UNITED STATES PATENT OFFICE.

DANIEL C. ROBERTS, OF TRENTON, NEW JERSEY.

TIRE-MOLD.

1,233,810.   Specification of Letters Patent.   Patented July 17, 1917.

Application filed June 19, 1916.  Serial No. 104,529.

*To all whom it may concern:*

Be it known that I, DANIEL C. ROBERTS, a citizen of the United States, residing at Trenton, in the county of Mercer and State of New Jersey, have invented certain new and useful Improvements in Tire-Molds, of which the following is a specification.

My invention relates to molds and especially to that class of molds which are used in building pneumatic tire shoes and casings.

The principal object of the invention is to provide a mold wherein the tread of the tire may be built-up and shaped independent of the side portions, thus enabling the operator to turn out any number of treads irrespective of the other parts of the tire; it being contemplated that the wear upon the tread, during usage, will cause the same to deteriorate and become worn much more quickly than the side portions of the tire.

The invention further aims to provide a mold of novel construction wherein the several relative parts may be readily associated in a single unit during the molding operation and, conversely, quickly withdrawn from about the article molded either before or after the vulcanization of the latter.

Another object is to provide a mold of the above character which is susceptible of an axial pressure to not only aid in the formation of the article to be molded prior to the vulcanizing step but to firmly retain the several parts of the mold in a secure position and preclude relative movement thereof.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a view in transverse section of the tread mold, showing in conjunction therewith means to clamp the several parts in a secure position, Fig. 2 is a view similar to Fig. 1, of the side section mold, Fig. 3 is a view in section taken on line 3—3 of Fig. 1 showing means to fasten certain sections of the mold together, Fig. 4 is a view in section of a slightly modified form of tread mold.

In the present embodiment the matrix of the preferred tread mold consists of opposed circumferential sections 10 and 11 which have their opposite faces cut away as indicated at 12 to form a mold cavity or chamber. Upon their inner periphery sections 10 and 11 are provided with suitable recesses 13 while just inwardly of the recesses are located oppositely alined inwardly directed ribs 14 as clearly shown in Fig. 1. The sections are further provided upon their outer periphery with opposite circumferential grooves 15 which, when the sections are in assembled relation receive a securing ring 16 which holds them in axial alinement while the section 17 is removed— for allowing the tire forming material to be placed in the mold.

On the other hand, a core or inner mold section 17 extends into the mold cavity 12 and has flanges 18 fitting the recesses 13 of the sections 10 and 11. Core 17 is also provided with circumferential grooves 19 opposite the curved surfaces of the ribs 14 of the sections.

The mold cavity, which is formed upon the assembly of the several parts of the device, is perceptibly arcuate when viewed in cross-section, as it appears in Fig. 1, its peripheral edges substantially cylindrical. Consequently the tread, when formed, will not only be arcuate when viewed in cross-section but it will have enlarged ribs at its peripheral edges such as will enable it to be operatively associated with the side sections of the tire.

An axial pressure, such as may be exerted through the instrumentality of the clamp designated in its entirety by the numeral 20, not only serves to bring the sections 10 and 11 into a properly alined position, but it also serves to retain all of the parts of the mold in a secure position during the molding operation. Both the ring 16 and the flanges 18 of the core 17 limit the inward movement of the sections 10 and 11 against the pressure exerted by the clamp 20 and the frictional engagement between those elements and the sections 10 and 11 may be sufficient to prevent relative movement under ordinary circumstances.

In the reduction of the invention to practice I have found it advisable to make the core or inner mold element 17 in sections, under certain circumstances such as clearly shown in Fig. 3. In this event the ends of the respective sections of the core are beveled as at 21 to lie in overlapping relation (see Fig. 3), while means such as shown at 22 may be employed to retain the sections against relative movement. Because of this arrangement, the inner mold section may be collapsed or dismembered when seating or unseating said inner core member.

In that form of tread mold shown in Fig. 1 it will be noticed that the opposed edges of the sections 10 and 11 adjacent, their outer periphery taper to a feather edge to form a continuous surface, opposed to the inner face of the core 17 thus rendering the tread when molded comparatively smooth upon its outer face. However in that form shown in Fig. 4 these edges lie in spaced relation when the sections 10 and 11 are in assembled relation and form opposed shoulders 23. Consequently, in this particular form, the inner face of the ring 16 forms a wall of the mold cavity and the tread will be provided with a circumferential rib upon its tread area at a point approximately midway its longitudinal edges.

In passing now to the side section mold shown in Fig. 2, the matrix is preferably in the form of a unitary annular body 24, cut out upon one side to receive the core 25; a mold cavity 26 being formed between the inner wall of the cut out of the body 24 and the inner wall of the core 25. These opposed walls are to be peculiarly fashioned, according to the circumstances of the case whereby the article molded may be operatively associated with the tread member above referred to. In the present embodiment the walls are so formed whereby the mold cavity is perceptively arcuate intermediate its longitudinal edges, and enlarged at both edges, as clearly shown. At a point slightly above the arcuate portions of the mold cavity the body 24 is provided with a circumferential rib 26 while the core is provided at an opposite point with a shallow groove 27 whereby the side portions molded will have an annular groove upon the outer face adjacent the crown to receive the rib of the tread member while the upper portion of the side section will taper to a feather edge. Below the arcuate portion of the mold cavity body 24 is provided with an annular groove 28 while the opposite portion of the core is cut away as at 29 so as to properly shape the shoe of the side section. It will also be noticed that the lower wall of the mold cavity extends at right angles to the outer face of the body 24 and the core 25 and also in parallelism to the inner and outer periphery of the body 24. A clamp such as shown at 30 may, if desired, be used to properly retain the core within the cavity of the body 24.

From the foregoing it is believed that the advantages and novel features of my invention will be readily understood and therefore further details and description is deemed unnecessary.

In reducing the invention to practice, it will be found that the form referred to herein as the most practical and preferred embodiment is the most efficient, but realizing that certain conditions will necessarily vary in concurrence with the adoption of the device, it is emphasized that various minor changes in the details of construction and in the proportion of parts may be resorted to when required without sacrificing any of the advantages of the invention, as defined in the appended claims.

Having thus fully described the invention, what is claimed as new and desired to be secured by Letters Patent is:—

1. A tread mold comprising a pair of complementary annular sections each having an annular shoulder at its outer periphery and an annular shoulder at its inner periphery and an annular rib adjacent to the last said annular shoulder, a ring surrounding corresponding portions of said complementary sections and normally seated between the first said annular shoulders so as to hold said complementary sections in co-axial relation, and a mold element having a molding surface normally extending between said annular ribs, while a portion of said mold element is seated between the annular shoulders of said inner periphery.

2. A tread mold comprising a pair of complementary annular sections each having an annular rib and an annular shoulder and being normally fitted together at their outer peripheries and spaced at their inner peripheries so as to provide a concaved molding surface, a ring surrounding said complementary sections at their meeting line so as to hold them in co-axial relation, and a mold element having a molding surface extending between said annular ribs of said pair of mold sections, said mold element being normally seated against said annular ribs and between said annular shoulders.

3. A tread mold comprising a pair of complementary annular sections each having an annular shoulder at its outer periphery, an annular shoulder at its inner periphery, a ring normally surrounding portions of said mold sections and seated between the first said annular shoulders thereof, and a collapsible mold element having a molding surface extending between said annular sections and seated between the annular shoulders of the inner peripheries of said annular sections.

In testimony whereof I affix my signature in presence of two witnesses.

DANIEL C. ROBERTS.

Witnesses:
M. E. JONES,
JESSIE W. BOHRER.